United States Patent [19]
Murakami et al.

[11] 3,738,460
[45] June 12, 1973

[54] HYDRAULIC RELEASED CLUTCH CONTROLLED BY ENGINE SPEED AND SHIFT SWITCHES

[75] Inventors: Noboru Murakami; Koji Nishida; Nobuyuki Hashimoto, all of Kariya, Japan

[73] Assignee: Aisin Seiki Kabushiki Kaisha Kariya-shi, Aichi-ken, Japan

[22] Filed: June 15, 1971

[21] Appl. No.: 153,175

[30] Foreign Application Priority Data
June 17, 1970 Japan................................ 45/52618
June 17, 1970 Japan................................ 45/52619
June 17, 1970 Japan................................ 44/52620

[52] U.S. Cl.......... 192/3.58, 192/91 R, 192/105 F, 91/458, 317/148.5
[51] Int. Cl............................................. F16d 67/00
[58] Field of Search...................... 192/3.58, 103 F, 192/105 F, .033, .052, .08

[56] References Cited
UNITED STATES PATENTS
3,204,730 9/1965 Alfieri et al.................... 192/3.58 X
2,057,740 10/1936 Price et al........................ 192/103 F
2,975,875 3/1961 Edelblut............................ 192/3.58

*Primary Examiner*—Benjamin W. Wyche
*Attorney*—Moonray Kojima

[57] ABSTRACT

Disclosed herein is an automatic control system of a friction disc clutch for vehicles, which comprises a source of fluid pressure, hydraulic servo means for disengaging the clutch, solenoid operated regulating valve means for controlling fluid pressure supplied to the servo means from the pressure source, an electronic control system for regulating the valve means in response to the rotation speed of the vehicle engine, and means for expediting discharge of fluid pressure from the servo means after completion of drive power train shifting operation thereby to realize quick and smooth clutching operation. As engine speed increases above idling, the control system gradually reduces current to the solenoid valve so that it gradually opens a servo exhaust port thereby permitting the clutch to be gradually engaged by springs.

5 Claims, 7 Drawing Figures

INVENTOR
NOBORU MURAKAMI
KOJI NISHIDA
NOBUYUKI HASHIMOTO
BY
ATTORNEY

HYDRAULIC RELEASED CLUTCH CONTROLLED BY ENGINE SPEED AND SHIFT SWITCHES

BACKGROUND

The present invention relates to a friction disc clutch for a vehicle, and more particularly to an automatic control system for the clutch.

SUMMARY

An object of the present invention is to provide an automatic control system for a friction disc clutch of a vehicle, which enables easier starting and drive power train shifting operations by eliminating manual operation of a clutch pedal provided with an ordinary vehicle.

Another object of the present invention is to provide an automatic control system for a friction disc clutch of a vehicle having the above-mentioned characteristics, wherein the system can be adopted for any ordinary type of a vehicle, thereby to decrease foot pedals from three to two.

A further object of the present invention is to provide an automatic control system for a friction disc clutch of a vehicle having the above-mentioned characteristics, wherein the engagement and disengagement of the clutch can automatically and smoothly be conducted in response to the engine rotation speed.

A still further object of the present invention is to provide an automatic control system for a friction disc clutch of a vehicle having the above-mentioned characteristics, wherein the system is provided with hydraulic control means for controlling the engagement and disengagement of the clutch and with an electric control system for regulating the hydraulic control means in good and accurate response to the engine rotation speed.

Yet another object of the present invention is to provide an automatic control system for a friction disc clutch of a vehicle having the above-mentioned characteristics, wherein suitable hydraulic servo means is adopted to control the engagement and disengagement of the clutch, the servo means being operable through fluid pressure control valve means regulated by the electric control system.

A still further object of the present invention is to provide an automatic control system for a friction disc clutch of a vehicle having the above-mentioned characteristics, wherein the fluid pressure control valve means is of a simple but durable construction available at a low manufacturing cost.

It is a more specific object of this invention to provide an automatic control system for a friction disc clutch of a vehicle having the above-mentioned characteristics, wherein the system is provided with means for controlling fluid pressure exhausted from the servo means through the fluid pressure control valve means after completion of each drive power train shifting operation thereby to realize quick and smooth clutching operation.

It is another more specific object of this invention to provide an automatic control system for a friction disc clutch of a vehicle having the above-mentioned characteristics, wherein a cut-off valve is interposed within the fluid circuit between a fluid pressure source and the servo means, the cut-off valve operated to block fluid pressure flow toward the servo means by the electric control system when shifting operation is made.

It is a still more specific object of this invention to provide an automatic control system for a friction disc clutch of a vehicle having the above-mentioned characteristics, wherein a current cut-off circuit is adopted for the electric control system, the current cut-off circuit making the control valve means inoperative for a short period of time after completion of each drive power train shifting operation and after the engine rotation of the vehicle exceeds its idling rotation.

It is yet a specific object of this invention to provide an automatic control system for a friction disc clutch of a vehicle having the above-mentioned characteristics, wherein a current switching circuit is adopted for the electric control system, the current switching circuit making the control valve means inoperative after completion of each drive power train shifting operation from the low speed ratio drive power train to a higher one.

An automatic control system of a friction disc clutch constructed in accordance with the present invention may comprise hydraulic servo means for engaging and disengaging the clutch, fluid pressure control valve means for controlling fluid pressure supplied to the servo means from a source of fluid pressure, solenoid means for regulating operation of the valve means by its energy in response to the rotation number of an engine of the vehicle, current control means for detecting the rotation number of the engine and for determining the amount of current supplied to the solenoid means, and means for controlling fluid pressure exhausted from the servo means through the valve means after completion of drive power train shifting operation, thereby to realize quick and smooth clutching operation.

DESCRIPTION OF THE DRAWINGS

Other objects and features of the present invention will be more clear in the following description of one preferred embodiment, especially when read in conjunction with the accompanying drawings, in which.

DESCRIPTION OF THE PREFERRED EMBODIMENTS

Figure 1:
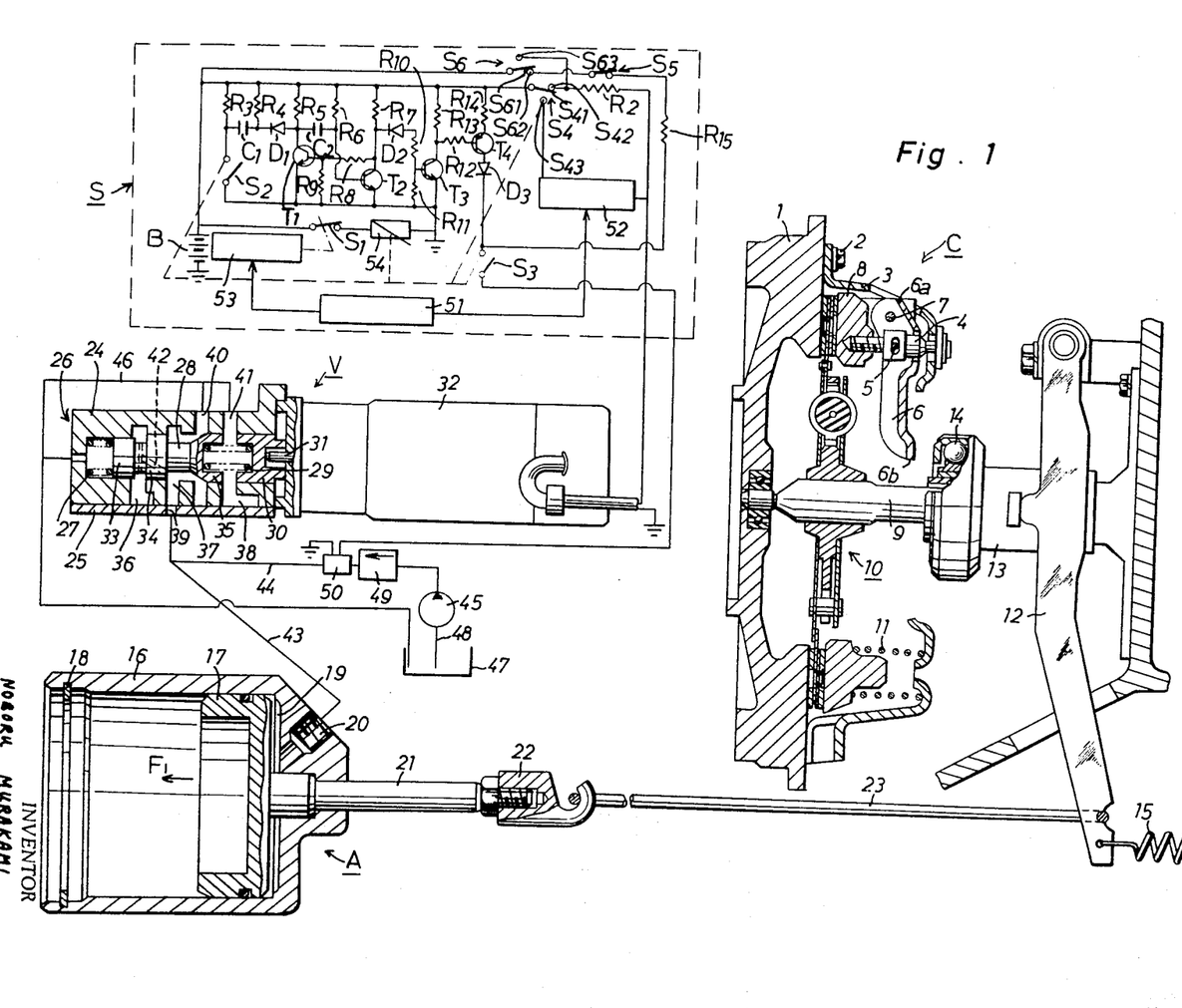
FIG. 1 is a part cross-sectional view of the preferred embodiment of the present invention, showing also connections of the constructing portions.

Referring now to the drawings in detail, a clutch arrangement C illustrated therein comprises a flywheel 1 which is connected to an engine through a drive shaft (not shown). The flywheel 1 has a clutch cover 3 secured firmly on the annular flange thereof by bolts 2. The clutch cover 3 is designed approximately in an annular shape and has surfaces arranged parallel with the flywheel 1. An adjusting bolt 4 is adjustably threaded in a pressure plate 8 through the clutch cover 3. A release lever 6 is swingably pivoted on the bolt 4 by a pivot pin 5. The pressure plate 8 is pivoted on one end portion 6a of the release lever 6 by a pivot pin 7. A clutch disc 10 is so mounted that the outer circumference thereof is interposed between the flywheel 1 and the pressure plate 8 and the inner hub thereof has a driven shaft 9 splined therein. A spring 11 is interposed between the clutch cover 3 and the pressure plate 8. Resilient force of the spring 11 normally holds the clutch disc 10 pressed between the flywheel 1 and the pressure plate 8 to obtain frictional engagement thereat.

A release fork 12 is swingably mounted on a portion of the vehicle body. Clockwise swing of the release fork 12 makes a release hub 13 proceed forward, which causes a release bearing 14 to engage with the other end 6b of the release lever 6. Consequently, clockwise swing of the release lever 6 displaces the pressure plate 8 right-ward. A return spring 15 is stretched between the release fork 12 and a portion of the vehicle body and biases the release fork 12 counter-clockwise.

Hydraulic servo means A comprises a housing 16, a piston 17 reciprocatably engaged within the cylindrical bore of the housing 16, and a stopper member 18 threaded within the bore of the housing 16. The housing 16 and the piston 17 incorporate to form a pressure chamber 19 to which a port 20 drilled through the housing 16 is always open. A piston rod 21 extending from the piston 17 has a hook 22 threaded in at its outer end. A release wire or cable 23 is stretched between the hook 22 and the free end of the release fork 12.

When the piston 17 is actuated and retracts or moves leftward in the figure by fluid pressure delivered into the pressure chamber 19 through the port 20, the release fork 12 makes its clockwise swing against the resilient force of the return spring 15 through the piston rod 21 and the release wire 23. This causes the release hub 13 to move toward the frictional disc clutch C and to urge the release bearing 14 against the release lever 6. Consequently, the clutch C disengages. When the fluid pressure is removed from the pressure chamber 19, the return spring 15 makes the release fork 12 swing counter-clockwise, the piston 17 returning to its forwarded position. The clutch C engages by resilient force of the spring 11.

Hydraulic pressure regulating valve means V comprises a valve housing 26 including a body member 24 and a cover member 25, springs 27 and 29, a spring retainer 30 and a valve member 28 engaged slidably within the cylindrical bore of the housing 26. The valve member 28 is provided with a small diameter land 33, a large diameter land 34 and a large diameter land 35 of which the diameter is same as that of the large diameter land 34. Chambers 36 and 37 are formed respectively between the lands 33 and 34 and between the lands 34 and 35. The land 35 and the spring retainer 30 form a chamber 38. A through hole 42 drilled in the valve member 28 provides constant connection between the chambers 36 and 37. Ports 39, 40 and 41 are provided on the valve housing 26 axially along the valve member 28. The port 39 keeps constant connection with the chamber 37, and the port 41 also opens always to the chamber 38. Sliding movements of the valve member 28 make the port 40 connect with and closed against the chamber 37.

A conduit 43 keeps constant connection between the port 39 and the port 20 of the hydraulic servo means A. The ports 40 and 41 are always in communication with a reservoir 47 through a conduit 46. A conduit 44 connects the conduit 43 always with a hydraulic pump 45 driven by the prime engine of the vehicle, the pump 45 being further connected with the reservoir 47 through a conduit 48. A flow regulating valve 49 and an electromagnetic cut-off valve 50 are disposed within the conduit 44.

A solenoid 32 is mounted to have its left side face against the right side of the valve housing 26. A plunger 31 of the solenoid 32 keeps engagement with the outer portion of the spring retainer 30. The hydraulic regulating valve means V is so constructed that the valve member 28 will not close the port 40 against the chamber 37 when the outer portion of the spring retainer 30 engages with the plunger 31 of the solenoid 32 with the spring 29 in its fully stretched situation.

While the cut-off valve 50 is kept open, fluid pressure discharged from the pump 45 is delivered to the pressure chamber 19 as well as to the chambers 37 and 36 through the conduits 44 and 43 and is circulated to the reservoir 47 through the pressure regulating valve means V.

When no current is supplied to the solenoid 32, there is no urging force produced to slide the valve member 28 leftward to close the port 40 against the chamber 37. Thus, it can be seen that the value of the fluid pressure within the circuit from the pump 45 to the hydraulic servo means A and to the chambers 37 and 36 is of the atmospheric pressure. Current supplied to the solenoid 32 operates the solenoid 32 to push the plunger 31 outward or leftward in the figure in accordance with the amount of the current supplied. The thrusting force of the plunger 31 is conveyed to the valve member 28 through the spring 29 and the valve member 28 moves leftward. The value of the fluid pressure within the circuit increases up to the one that is shown as:

$$\frac{\text{(Thrusting Force of the plunger 31)} - \text{(Resilient Force of the spring 27)}}{\text{Difference of cross-sectional areas between the lands 33 and 34}}$$

The thrusting force of the plunger 31 is changeable in accordance with the changes of the current supplied to the solenoid 32. And the changes of the thrusting force of the plunger 31 varies in turn the fluid pressure value within the circuit. The indirect transmission of the thrusting force of the plunger 31 by way of the spring 29 provides the thrusting force of the plunger 31 with wider changes than otherwise.

Figure 2:
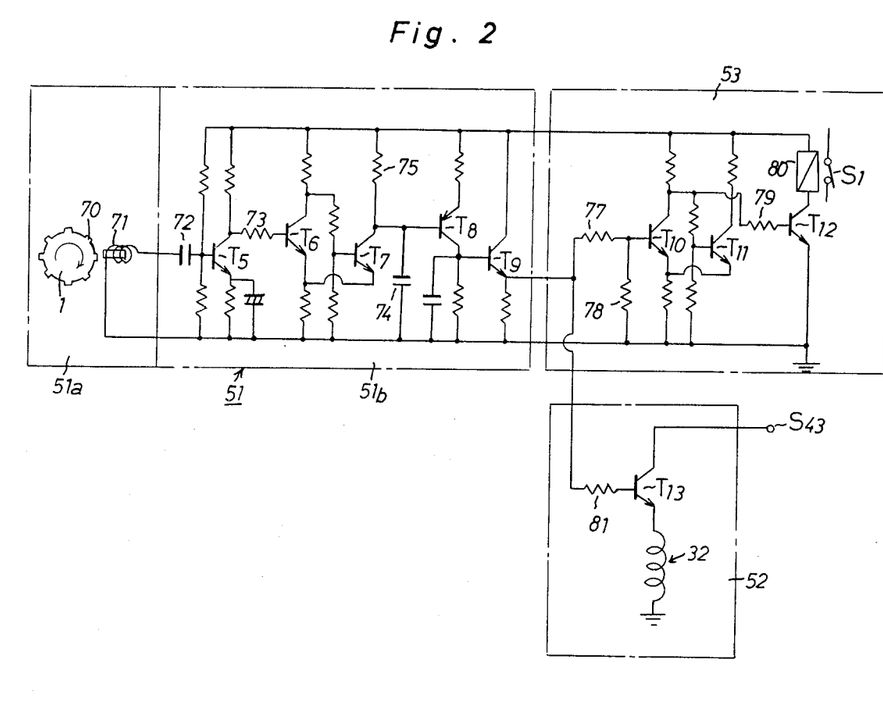
FIG. 2 depicts a preferred embodiment of an electric control system adopted to the embodiment of FIG. 1.

An automatic electric control system S for controlling amount of current supplied to the solenoid 32 and for regulating the current supplied to the cut-off valve 50 comprises a detecting circuit 51 for detecting the rotation number of the prime engine of the vehicle. The control system S is also provided with a current control circuit 52 for varying amount of current supplied to the solenoid 32 in accordance with the engine rotation number by way of analogue voltage issued from the detecting circuit 51. Adopted for the control system S is a switch control circuit 53 which, receiving analogue voltage issued from the detecting circuit 51, operates to close a switch $S_1$ at the idling rotation of the prime engine and to open it when the engine rotation exceeds its idling rotation number. A relay 54 is also provided with the control system. The relay 54 opens switches $S_2$ and $S_3$ and makes a movable terminal $S_{41}$ of a switch $S_4$ get in contact with a fixed terminal $S_{42}$ of the switch $S_4$ while the switch $S_1$ is closed. And while the switch $S_1$ is open, the relay 54 closes the switches $S_2$ and $S_3$ and makes the movable terminal $S_{41}$ get in contact with another fixed terminal $S_{43}$ of the switch $S_4$.

The control system S is also provided with a low gear switch $S_5$ which opens when the first low speed drive power train or the reverse drive power train is selected, a shift-lever switch $S_6$ wherein a movable terminal $S_{61}$ is connected to a fixed terminal $S_{63}$ thereof while the shift-lever of the vehicle is held manually and to another fixed terminal $S_{62}$ when the shift-lever is freed, fixed resistors $R_2 - R_{15}$, condensers $C_1$ and $C_2$, diodes $D_1 - D_3$, transistors $T_1 - T_4$, and an electric source B. In the control system S of the mentioned construction, a monostable multivibrator is formed with the resistors $R_5 - R_9$, the condenser $C_2$ and the transistors $T_1$ and $T_2$. Thus, when the transistor $T_1$ becomes conductive, the transistors $T_3$ and $T_4$ become conductive and also the reverse operation is conducted.

Further described below are a preferred embodiment of the detecting circuit 51, the current control circuit 52 and the switch control circuit 53 for the control system S in reference with FIG. 2. The detecting circuit 51 comprises an engine rotation detecting circuit 51a and a converter circuit 51b.

The engine rotation detecting circuit 51a has a senser 71 of a well-known electro-magnetic pickup device. The teeth of a starter gear 70 provided on the outer circumference of the flywheel 1 changes magnetic flux of the senser 71. Thus, the senser 71 detects rotation speeds of the engine as sine waves.

In the converter circuit 51b, a transistor $T_5$ amplifies the sine waves from the senser 71 through a condenser 72. A first Schmitt circuit is provided that includes transistors $T_6$ and $T_7$ to convert the amplified output from the transistor $T_5$ to pulse output through a resistor 73. A condenser 74 is charged through a resistor 75 in response with the pulse output from the first Schmitt circuit. The pulse output is converted to the analogue amount by way of an integrator which consists of the condenser 74 and the resistor 75. The collector potential of a transistor $T_8$ falls and raises respectively in response with the voltage increase and decrease of the condenser 74. A transistor $T_9$ amplifies the current of the collector output from the transistor $T_8$.

The converter circuit 51b constructed as described above, the transistor $T_6$ of the first Schmitt circuit becomes non-conductive while the transistor $T_7$ becomes conductive when there is no engine rotation. Thus, the voltage of the condenser 74 is lowered and the collector voltage of the transistor $T_8$ becomes the highest therefor. The rotation of the engine causes repeated alternate on-off operations of the transistors $T_6$ and $T_7$ of the first Schmitt circuit. While the transistor $T_7$ is conditioned to be non-conductive, the condenser 74 is charged through the resistor 75 to increase the base voltage of the transistor $T_8$. This causes the collector potential of the transistor $T_8$ to fall down in accordance with the voltage increase of the condenser 74. Consequently, the emitter potential of the transistor $T_9$ falls down in comply with the increase of the engine rotation.

The current control circuit 52 includes a transistor $T_{13}$. The base end of the transistor $T_{13}$ is in connection with the emitter end of the transistor $T_9$ through a resistor 81. While, the collector end thereof is connected to the fixed terminal $S_{43}$ of the switch $S_4$ and the emitter end thereof is connected with the solenoid 32. In the idle rotation of the engine, the transistor $T_{13}$ is conductive to supply the solenoid 32 with a current of the high value in accordance with the emitter potential of the transistor $T_9$.

When the engine rotation number exceeds a predetermined one, the falling-down of the emitter potential of the transistor $T_9$ makes the base voltage of the transistor $T_{13}$ lower, and in turn, the current supplied to the solenoid 32 decreases gradually.

The further increase of the engine rotation makes the emitter potential of the transistor $T_9$ fall down. And the current supplied with the solenoid 32 further decreases in correspondence with the increase of the engine rotation.

The switch control circuit 53 comprises a second Schmitt circuit. This second Schmitt circuit includes a transistor $T_{11}$ and a transistor $T_{10}$ connected with the emitter end of the transistor $T_9$ through a resistor 77. Adopted for the switch control circuit 53 are a transistor $T_{12}$ and a relay 80. The base end of the transistor $T_{12}$ is connected with the collector end of the transistor $T_{10}$ through a resistor 79. While, the collector end thereof is connected to the relay 80 and the emitter end thereof is grounded. When the engine is conditioned to its idling rotation, the emitter potential of the transistor $T_9$ is high to make the transistor $T_{10}$ conductive and the transistor $T_{11}$ non-conductive, the transistor $T_{12}$ non-conductive. The increase of the engine rotation up to the predetermined number makes the emitter potential of the transistor $T_9$ fall down. This makes the transistor $T_{10}$ non-conductive and the transistor $T_{11}$ conductive, the transistor $T_{12}$ conductive. The transistor $T_{12}$ conditioned to be conductive makes the relay 80 operative to open the switch $S_1$, but while the transistor $T_{12}$ is non-conductive, the relay 80 becomes inoperative to close the switch $S_1$.

With the preferred embodiment of the present invention as mentioned above, while the engine stays at its idling rotation, the electric system S detects the idling rotation of the engine to close the switch $S_1$ by way of the switch control circuit 53. And in response with the closing of the switch $S_1$, the relay 54 operates to open the switches $S_2$ and $S_3$ as well as to let the movable terminal $S_{41}$ get in contact with the fixed terminal $S_{42}$. At the same time, since the shift-lever is not held manually, the movable terminal $S_{61}$ of the shift lever switch $S_6$ is in contact with the fixed terminal $S_{62}$. And the low gear switch $S_5$ stays closed since the shift lever is conditioned to its neutral position. The system S supplies the solenoid 32 with current of high value the amount of which is predetermined by the fixed resistor $R_2$. Then, the fluid pressure regulating valve means V increases the fluid pressure value up to the high pressure which is supplied to the pressure chamber 19 of the servo means A. The piston 17 is retracted or moves leftward by thrusting force $F_1$ of the high fluid pressure in the pressure chamber 19.

As explained previously, the retraction of the piston 17 swings the release fork 12 clockwise against the resilient force of the spring 15 through the piston rod 21 and the release wire 23. The release fork 12 then operates the release hub 13, the release bearing 14 and the release lever 6 which now swings clockwise against the resilient force of the spring 11. The clutch disc 10 disengages entirely from both of the flywheel 1 and the pressure plate 8. While the friction disc clutch C is in its disengaged position, the piston 17 of the servo means A stays at its left end position within the housing 16.

When the shift lever is held manually to start the vehicle, the movable terminal $S_{61}$ of the shift lever switch $S_6$ gets in contact with the fixed terminal $S_{62}$. The control system S still keeps supplying the solenoid 32 with current of the high value.

The first low speed ratio drive power train or reverse drive power train being completed, the low gear switch $S_5$ becomes open and the movable terminal $S_{61}$ returns to the fixed terminal $S_{62}$. When the engine rotation number is increased, the switch control circuit 53 opens the switch $S_1$ at the moment the engine rotation number exceeds the idling one. At the same time, the relay 54 closes the switches $S_2$ and $S_3$ and the movable terminal $S_{41}$ of the switch $S_4$ is connected with the fixed terminal $S_{43}$.

Thus, the control system S decreases gradually the current supplied to the solenoid 32 in accordance with the engine rotation increase by means of the current control circuit 52. Then, in accordance with the increase of the engine rotation number the fluid pressure value within the pressure chamber 19 has gradually decrease.

The decrease of the fluid pressure supplied to the pressure chamber 19 decreases the leftward thrusting force onto the piston 17. The total resilient force of the springs 15 and 11 makes the piston 17 move rightward and finally works engage the clutch C in the process already described.

In starting the vehicle as mentioned, when the switches $S_2$ and $S_3$ becomes closed, the monostable multi-vibrator turns operative. The transistor $T_4$ stays conductive for a very short period of time which is determined by capacities of the resistor $R_6$ and the condencer $C_2$. This supplies current to the electromagnetic cut-off valve 50 to cut off the communication between the pump 45 and the pressure chamber 19 of the hydraulic servo means A for the said short period of time. Discharge of working fluid from the pressure chamber 19 is much expedited and the piston 17 is pushed much faster rightward within the housing 16 to condition the clutch C to be ready for immediate engagement.

To effect smooth clutching operation, it is naturally necessary to put the clutch arrangement C in the position ready to engage in the possible shortest period of time. Without the electromagnetic cut-off valve 50, however, the clutch C cannot be conditioned as desired, since operation fluid delivered from the pump 45 has to be discharged in addition to operation fluid within the pressure chamber 19. This causes time lag in the clutching operation. Thus, in the preferred embodiment of the present invention, the electromagnetic cut-off valve 50 performs a very important role that the said possible time lag can be eliminated as there is no necessity to discharge additional operation fluid through the exhausting circuit. The mentioned very short period of time is measured to be the period of time necessary to condition the clutch C to the position ready to engage immediately. Now in shifting the low speed ratio drive power train to a higher speed ratio drive power train, when the shift lever is manually held, the movable terminal $S_{61}$ of the shift lever switch $S_6$ is positioned in contact with the fixed terminal $S_{63}$. This lets the control system S controls the current supplied to the solenoid 32 to be the high value. And the pressure regulating valve means V makes the fluid pressure supplied to the pressure chamber 19 to be the high value. In turn, the clutch C is conditioned to its full disengagement.

The selected higher speed ratio drive power train being completed, the low gear switch $S_5$ closes and the supply of the current of the high value to the solenoid 32 is continued. And the clutch C stays in its full disengagement condition. When the shift lever is freed, the movable terminal $S_{61}$ of the shift lever switch $S_6$ returns to the fixed terminal $S_{62}$. The solenoid 32 is supplied with current in accordance with the engine rotation number. At the same time, current is supplied to the cut-off valve 50 to cut off the communication between the pump 45 and the pressure chamber 19 of the servo means A. Consequently, the operation fluid within the pressure chamber 19 is discharged at a possible fastest speed to let the clutch C start to engage smoothly without possible time lag. And the clutch C is gradually conditioned to its full engagement correspondingly with the increase of the engine rotation number, causing no unpleasant shocks to the driver. As described above in detail, the preferred embodiment of the present invention is provided with the electromagnetic cut-off valve in the hydraulic circuit between the pump and the hydraulic servo means. Supply of current to the cut-off valve for a suitable period of time at each starting and at the end of each shifting operation cuts off the communication between the pump and the servo means. Thus, the discharge Of operation fluid within the servo means is much expedited for faster clutch engagement. As well observed, in this embodiment, eliminated is possible time lag in engaging the clutch arrangement which is undesirably accompanied with such apparatus as to conduct engagement and disengagement of the clutch means in response to the engine rotation number. And the period of time to condition the clutch to the position ready for immediate engagement is much shortened to finally avoid ununiformity of the engine rotation number at the start of clutching operation. This enables very smooth starts of vehicle and prevents undesired excessive engine racing as well as slips of the clutch to increase the durability of the clutch.

Figure 3:
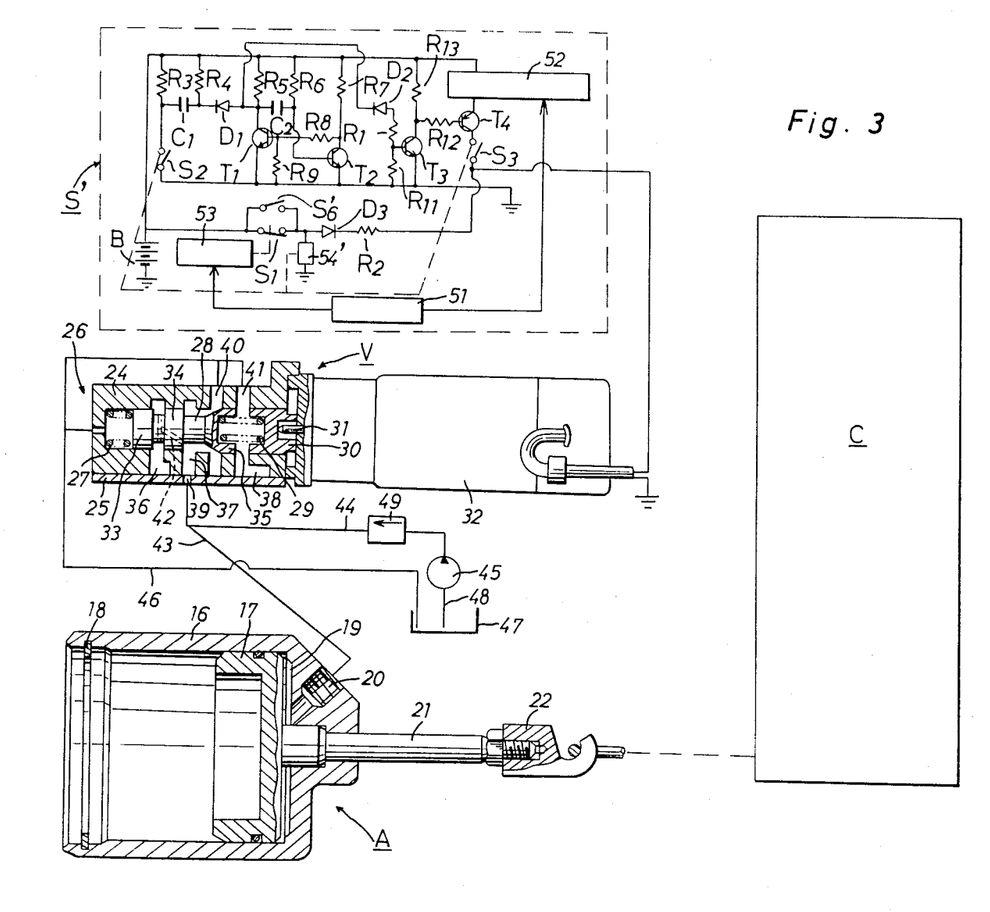
FIG. 3 is a part cross-sectional view of the second preferred embodiment of the present invention, showing also connections of the constructing portions.
Figure 4:
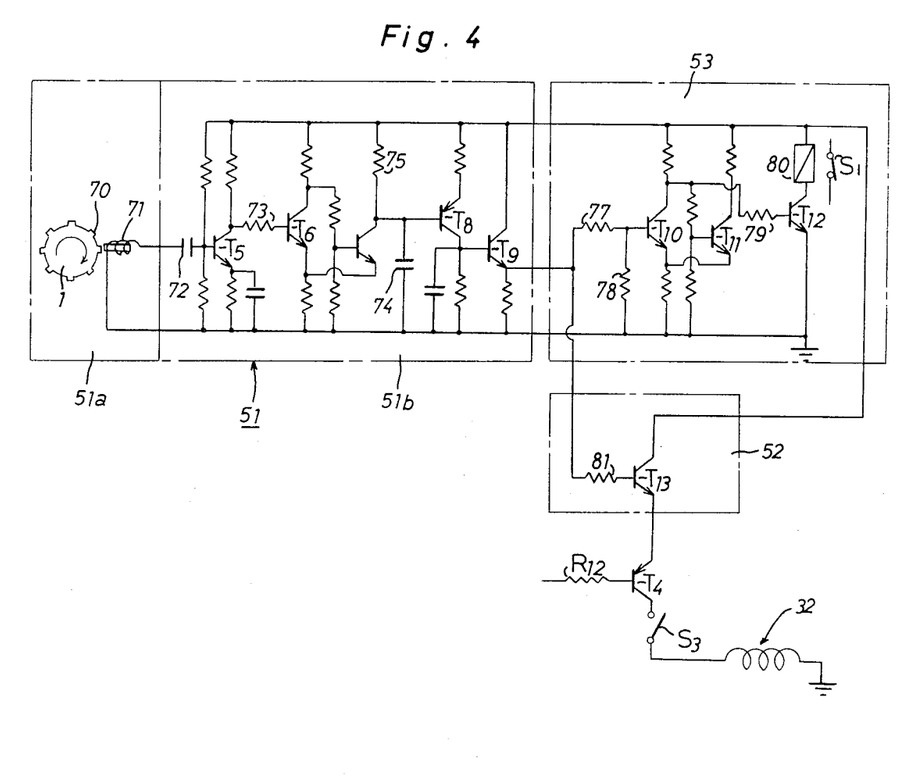
FIG. 4 depicts a preferred embodiment of an electric control system adopted to the embodiment of FIG. 3.

Reference is made to FIGS. 3 and 4 which illustrate a second preferred embodiment of the present invention. This second preferred embodiment is characterized in that the frictional clutch is enabled to engage quickly and smoothly as the current delivered to the solenoid means is cut off for a short period of time at the moment the engine rotation exceeds the idling one while no shifting operation is made for changing drive power trains. In the figures and explanations hereafter, similar reference numerals indicate similar parts of the device in accordance with the first embodiment.

In the second preferred embodiment, there is no change from the first embodiment in constructions and operations of the clutch means, the hydraulic servo means and the hydraulic pressure regulating valve means. And explanations of the constructions and operations of these means are eliminated.

An automatic electric control system S' for controlling amount of current supplied to the solenoid 32 comprises a detecting circuit 51 for detecting the rotation number of the prime engine of the vehicle. The control system S' is also provided with a current control circuit 52 for varying amount of current supplied to the solenoid 32 in accordance with the engine rotation number by way of the analogue voltage issued from the detecting circuit 51. Adopted for the control system S' is a switch control circuit 53 which, receiving the analogue voltage issued from the detecting circuit 51, operates to close a switch $S_1$ at the idling rotation of the prime engine and to open it when the engine rotations exceeds its idling rotation number. A relay 54' is also provided with the control system S'. The relay 54' opens switches $S_2$ and $S_3$ while the switch $S_1$ is closed. And while the switch $S_1$ is open, the relay 54' closes the switches $S_2$ and $S_3$.

The control system S' is also provided with a shift-lever switch $S'_6$ which becomes closed while the shift-lever of the vehicle is manually held and becomes open while the shift-lever is freed, fixed resistors $R_2 - R_{13}$, transistors $T_1 - T_4$, diodes $D_1 - D_3$, condensers $C_1$ and $C_2$ and an electric source B. In the control system S' of the mentioned construction, a monostable multi-vibrator is formed with the fixed resistors $R_5 - R_9$, the transistors $T_1$ and $T_2$ and the condenser $C_2$.

The constructions and operations of the detecting, current control and switch control circuits 51, 52 and 53 are same as described in the first preferred embodiment. Discriptions in detail for these circuits are, therefore, eliminated. In the second preferred embodiment, however, it should be noted that the emitter end of transistor $T_{13}$ of the current control circuit 52 is connected to the emitter end of the transistor $T_4$, the collector end of which extends to the solenoid 32 through the switch $S_3$.

This electric control system S' varies its supplying amount of current to the solenoid 32 in accordance with the increase and decrease of the rotation number of the prime engine when no drive power train shifting operation is made. In drive power shifting operation, the control system S' supplies current to the solenoid 32 in the amount of the high value regardless of the rotation number of the prime engine of the vehicle. At the same time, the fluid pressure regulating valve means V controls the fluid pressure supplied from the pump 45 to the chamber 19 in correspondence with the changes of the current supplied to the solenoid 32. This tells in short that the engine rotation changes are converted finally to the changes of the fluid pressure supplied to the pressure chamber 19 of the servo means A.

With the second preferred embodiment of the present invention as mentioned above, while the engine stays at its idling rotation, the control system S' detects the idling rotation of the engine to close the switch $S_1$ by way of the switch control circuit 53. And in responce to the closing operation of the switch $S_1$, the relay 54' operates to open the switches $S_2$ and $S_3$. At the same time, since the shift-lever is not held manually, the shift-lever switch $S'_6$ is open. Thus, the system S' supplies the solenoide 32 with current of the high value, the amount of which is predetermined by the fixed resistor $R_2$. Now the fluid pressure regulating valve means V increases the fluid pressure value up to the high value which is supplied to the pressure chamber 19 of the servo means A. The piston 17 is retracted or moves leftward by thrusting force of the fluid pressure in the pressure chamber 19.

As already explained well, the retraction of the piston 17 swings the release fork 12 clockwise against the resilient force of the spring 15 through the piston rod 21 and the release wire 23. The release fork 12 then operates the release hub 13, the release bearing 14 and the release lever 6 which now swings clockwise against the resilient force of the spring 11. The clutch disc 10 disengages entirely from both of the flywheel 1 and the pressure plate 8. Thus, the frictional clutch C is kept in its entire disengagement condition.

Then the shift-lever is held manually to start the vehicle, the shift-lever switch $S'_6$ becomes closed, but the output current from the control system S' is kept at the high value. And when the shift-lever is freed, the shift-lever switch $S'_6$ becomes open. Thus, during the mentioned operation of the shift-lever, the clutch C is conditioned to its disengagement position.

The low speed ratio drive power train or reverse drive power train being completed, the engine rotation is increased, and at the moment it exceeds its idling number, the switch control circuit 53 opens the switch $S_1$. At the same time the relay 54' close the switches $S_2$ and $S_3$ to operate the monostable multi-vibrator. Then, the transistor $T_4$ turns to be non-conductive for a short period of time predetermined by way of the resistor $R_6$ and the condenser $C_2$ and, then, returns to be conductive. This causes that the current supplied to the solenoid 32 becomes zero at a time at the moment the engine rotation exceeds its idling number, the current increased up after the short period of time. Successively, the control system S' decreases gradually the current supplied to the solenoid 32 in accordance with the increase of the engine rotation by means of the current control circuit 52.

The sudden decrease of the current supplied to the solenoid 32 down to nothing from the high value eliminates leftward thrusting force acting onto the valve 28 of the pressure regulating valve means V. This provides at a time the maximum cross-sectional area for the fluid flow passage between the ports 39 and 40. Fast discharge of the fluid from the pressure chamber 19 of the servo means A takes place to cause a quick rightward movement of the piston 17. This quick rightward movement of the piston 17 is continued for the short period of time and then fluid pressure within the pressure chamber 19 is remained. The quick rightward movement of the piston 17 is prevented and turned to a gradual movement in accordance with the pressure decrease in response to the increase of the engine rotation. Through the above-mentioned operation, the clutch C is conditioned to be ready to engage at the moment the engine rotation exceeds its idling number, engaging fully in correspondence with the increase of the engine rotation. And the vehicle starts.

In running forward, the low speed ratio drive power train is shifted up to a higher speed ratio drive power train. When the shift lever is manually held, the shift-lever switch $S'_6$ is closed to supply current of the high value to the solenoid 32. And the clutch C is conditioned to its disengagement position. Then, when the shift-lever is freed upon completion of the shifting operation, the shift-lever switch $S'_6$ is opened and the solenoid 32 is supplied with current of the amount in accordance with the engine rotation. The increase of the engine rotation leads the clutch C to its full engagement.

As described above, the second preferred embodiment provides such automatic control system for a friction disc clutch as to make the output current from the electric control system zero for a short period of time when the engine rotation number increases over its idling one. And after the said short period of time, the output current is increased up to a predetermined value in response to the engine rotation number. To make the output current from the control system zero at a time works consequently to make the cross-sectional area of the fluid exhaust passage within the servo means the maximum one thereof. This urges the discharge of the fluid from the pressure chamber of the servo means to engage the clutch quickly and smoothly, eliminating differences of the engine rotation number at which the clutch starts to engage.

Figure 5:
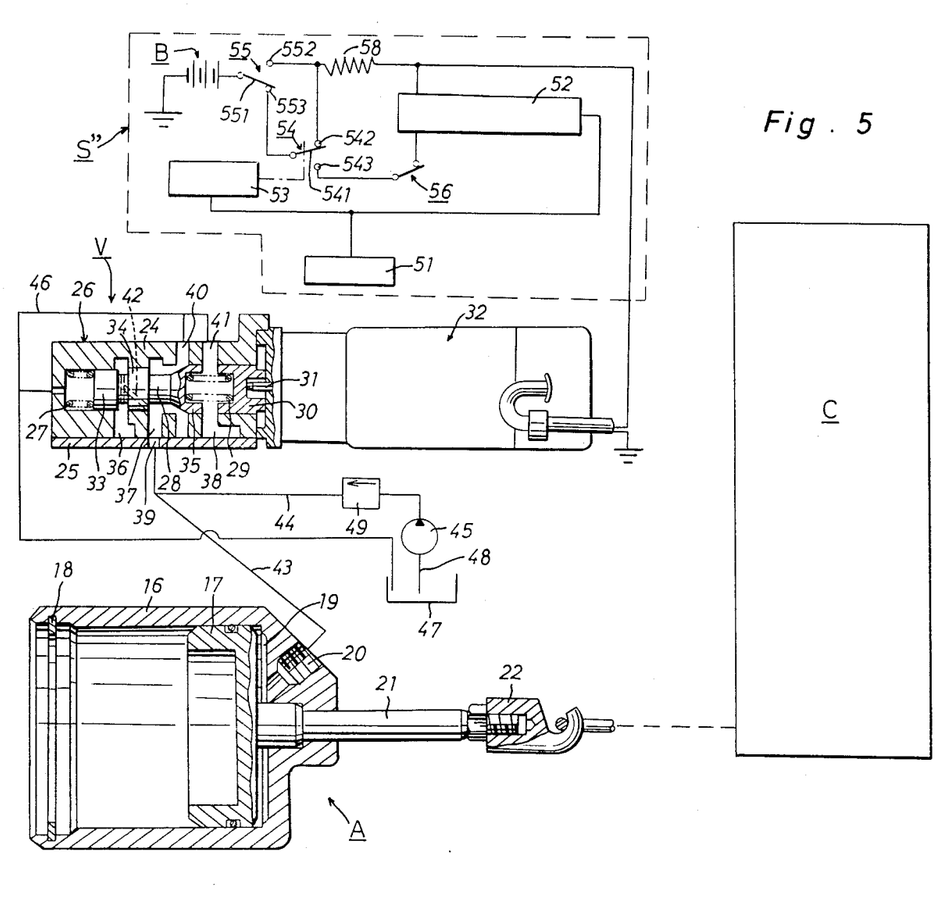
FIG. 5 is a part cross-sectional view of the third preferred embodiment of the present invention, showing also connections of the constructing portions.
Figures 6, 7:
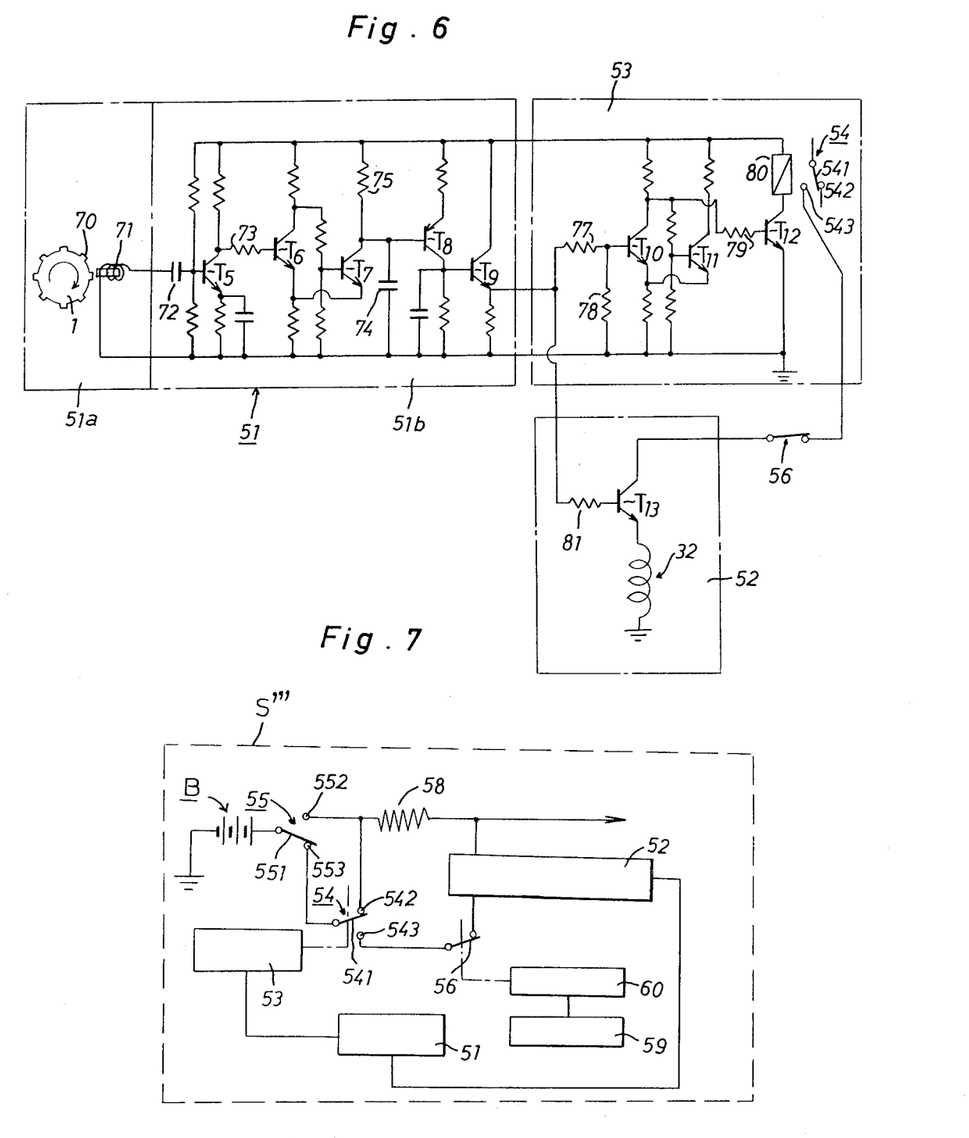
FIG. 6 depicts a preferred embodiment of an electric control system adopted to the embodiment of FIG. 5.
FIG. 7 depicts another embodiment of an electric control system adopted to the embodiment of FIG. 5.

A third preferred embodiment of the present invention is described hereafter with reference to FIGS. 5, 6 and 7. This third preferred embodiment is also provided, as in the case of the previous embodiments, with such features that the frictional clutch is operatively connected with a hydraulic servo means, wherein supply of high fluid pressure disengages the clutch and non-supply or discharge of the high fluid pressure engages the clutch. The servo means is controlled by a hydraulic pressure control valve means which is, in turn, controlled by an electric control system.

The third embodiment is characterized in that the clutch engages gradually in accordance with the engine rotation increase through the low speed ratio and reverse drive power trains but upon drive-power train shifting to a higher train, the current supply to the hydraulic pressure control valve means is cut off to produce immediate clutch engagement, the clutch yet engaging without shocks because of slight time lag caused by fluid operation.

The overall construction of the device is very similar to that of the embodiment heretofore described. Similar reference numerals are used to indicate similar parts. And the constructions and operations of the clutch means, the hydraulic servo means, and the pressure regulating valve means are omitted since they are just same as already explained in the previous embodiments.

An automatic electric control system S'' for controlling amount of current supplied to the solenoid 32 comprises a detecting circuit 51 for detecting the rotation number of the prime engine of the vehicle. The control system S'' is also provided with a current control circuit 52 for varying amount of current supplied to the solenoid 32 in accordance with the engine rotation number by way of analogue voltage issued from the detecting circuit 51. Adopted for the control system S'' is a switch control circuit 53 which, receiving analogue voltage issued from the detecting circuit 51, makes a movable terminal 541 of a switch 54 get in contact with a fixed terminal 542 at the idling rotation of the prime engine and makes the movable terminal 541 get in contact with another fixed terminal 543 when the engine rotation exceeds its idling rotation number. The control system S'' is also provided with a shift-lever switch 55 wherein a movable terminal 551 is connected to a fixed terminal 552 thereof while the shift-lever of the vehicle is held manually and to another fixed terminal 553 when the shift-lever is freed, a low gear switch 56 which closes only when the first low speed ratio drive power train or the reverse drive power train is selected, a fixed resistor 58 and an electric source B. The solenoid 32 is connected to the output terminal of the fixed resistor 58.

In the third preferred embodiment, the detecting circuit 51, the current control circuit 52 and the switch control circuit 53 for the control system S'' have same constructions and operations as previously described in the preceding preferred embodiments. The descriptions of the constructions and operations of these circuits are eliminated.

With this preferred embodiment of the present invention as mentioned above, while the engine stays at its idling rotation, the control system S'' detects the idling rotation of the engine to let the movable terminal 541 of the switch 54 get in contact with the fixed terminal 542 by way of the switch control circuit 53. At the same time, since the shift-lever is not held manually, the movable terminal 551 of the shift lever switch 55 is in contact with the fixed terminal 553. And the low gear switch 56 stays open since the shift lever is conditioned to its neutral position. The system S' supplys the solenoid 32 with current of high value the amount of which is predetermined by the fixed resister 58. Then, the fluid pressure regulating valve means V increases the fluid pressure value up which is supplied to the pressure chamber 19 of the servo means A. The piston 17 is retracted or moves leftward by thrusting force of the fluid pressure in the pressure chamber 19.

As explained previously, the retraction of the piston 17 swings the release fork 12 clockwise against the resilient force of the spring 15 through the piston rod 21 and the release wire 23. The release fork 12 then operates the release hub 13, the release bearing 14 and the release lever 6 which now swings clockwise against the resilient force of the spring 11. The clutch disc 10 disengages entirely from both of the flywheel 1 and the pressure plate 8. While the friction disc clutch C is in its disengaged position, the piston 17 of the servo means A stays at its left end position within the housing 16.

When the shift lever is held manually to start the vehicle, the movable terminal 551 of the shift lever switch 55 gets in contact with the fixed terminal 552. The control system S'' still keeps supplying the solenoid 32 with current of the high value.

The low speed ratio drive power train or reverse drive power train being completed, the low gear switch 56 becomes closed. When the engine rotation number is increased, in the control system S'' the switch control circuit 53 makes the movable terminal 541 of the switch 54 get in contact with the fixed terminal 543. The electric control system S'' decreases gradually the current supplied to the solenoid 32. Then, in accordance with the increase of the engine rotation number the fluid pressure value within the pressure chamber 19 has gradual decreases.

The decrease of the fluid pressure supplied to the pressure chamber 19 decreases the leftward thrusting force onto the piston 17. The total resilient force of the springs 15 and 11 makes the piston 17 move rightward and finally works to engage the clutch C in the process already described.

Now in shifting the low speed ratio drive power train to a higher speed ratio drive power train, when the shift lever is manually held, the movable terminal 551 of the shift lever switch 55 is positioned in contact with the fixed terminal 552. This lets the control system S″ controls the current supplied to the solenoid 32 to be of the high value. And the pressure regulating valve means V makes the fluid pressure supplied to the pressure chamber 19 to be at the high value. In turn, the clutch C is conditioned to its full disengagement.

The selected higher speed ratio drive power train being completed, the low gear switch 56 opens and the supply of the current of the high value to the solenoid 32 is continued. And the clutch C stays in its full disengagement condition. When the shift lever is freed, the movable terminal 551 of the shift lever switch 55 returns to the fixed terminal 553. And as the engine rotation number does not decrease down to its idling one in general at the shifting operation, the movable terminal 541 of the switch 54 stays in contact with the fixed terminal 543. The current supplied to the solenoid 32 becomes zero at a time, which makes the pressure in the servo means A to be equal to the atomospheric one to engage the clutch quickly. The clutch C can be engaged with no shock because of time lag caused by the facts that the fluid cannot be discharged from the servo means A at a time and that the piston 17 moves faster than the time to start vehicle, but there is slight time-lag, too. Thus, undesired excessive engine racing and slips of the clutch C after completion of the shifting operation can well be prevented to increase the durability of the clutch C.

In the third embodiment, the control system can be replaced with another system S‴ shown in FIG. 8. The system S‴ in FIG. 8 is to open and close the switch 56 in accordance with the speed of the vehicle. The system comprises additionally a speed detecting circuit 59 for detecting the speed of the vehicle and another switch control circuit 60 for keeping the switch 56 closed while the vehicle runs under a certain predetermined speed, for example, a speed at which the speed ratio drive power train is shifted up from the first to the second, and for opening the switch 56 when the speed of the vehicle reaches the predetermined one. In the above-mentioned embodiments, the device is operated by the engine rotation number, but the displacement of the accelerator pedal can also operate the device. And the device can be adopted for a vehicle provided with an automatic transmission as well as that equipped with a manual transmission. And the operation fluid is not limitted to liquid.

Having now fully set forth both structures and operations of three preferred embodiments of the concept underlying the present invention, it may be that various other embodimentS as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

What is claimed is:

1. An automatic control system of a friction disc clutch for a vehicle comprising an engine, a drive power train, a source of fluid pressure, hydraulic servo means for engaging and disengaging said clutch, fluid pressure regulating valve means for controlling fluid pressure supplied to said servo means from said pressure source, solenoid means for regulating operation of said valve means, said system comprising, current control means for keeping current supplied to said solenoid means at a predetermined high value while said engine of said vehicle is conditioned to its idling rotation, for decreasing said current gradually down to a predetermined low value in accordance with increase of said engine rotation, for cutting off said current when said engine rotation reaches up a preset high value, and for increasing said current up to said predetermined high value upon shifting operation of said drive power train of said vehicle, thereby to engage said clutch when said engine rotation reaches and exceeds a certain preset number and to disengage said clutch when said engine is conditioned to its idling rotation and when drive power train is shifted, blocking means for preventing fluid pressure being supplied to said servo means for a predetermined short period of time after the engine rotation exceeds its idling rotation, and switching means for controlling operation of said blocking means in accordance with operation of said current control means.

2. An automatic control system as claimed in claim 1, wherein said current control means comprises an electric source, an engine rotation detecting circuit for detecting the rotation number of said engine as sine waves, a converter circuit for converting said sine waves to pulse signals and further to analogue voltage, a current control circuit for controlling said current supplied to said solenoid means in response to the value of said analogue voltage, a switch control circuit for controlling said switching means in response to the value of said analogue voltage, and a switching circuit for connecting said electric source to said solenoid means either directly or indirectly through said current control circuit.

3. An automatic control system as claimed in claim 2, wherein said switching means comprises a monostable multi-vibrator regulated by said switch control circuit, and a transistor conducted by said monostable multi-vibrator to control operation of said blocking means.

4. An automatic control system as claimed in claim 1, wherein said blocking means comprises an electromagnetic cut-off valve interposed between said pressure source and said servo means.

5. An automatic control system as claimed in claim 1, wherein said switching means comprises a relay controlled by said current control means, on-off switch means operated by said relay, a monostable multi-vibrator driven by turning-on operation of said switch means, and a transistor regulated by said monostable multi-vibrator and controlling current supply to said cut-off valve.

* * * * *